United States Patent [19]
Landry et al.

[11] Patent Number: 5,946,461
[45] Date of Patent: Aug. 31, 1999

[54] SYSTEM FOR POSITIONING IMAGE INFORMATION ON SPECIAL PRINT MEDIA SHEETS

[75] Inventors: John E. Landry, Washington, D.C.; Alane R. Oneill, Alexandria, Va.

[73] Assignee: Xerox Corporation, Stamford, Conn.

[21] Appl. No.: 08/846,573

[22] Filed: Apr. 30, 1997

[51] Int. Cl.$^6$ .................................................. B41B 15/00
[52] U.S. Cl. ........................ 395/117; 395/105; 395/114; 395/115; 358/400; 358/402; 358/403; 358/468; 358/470
[58] Field of Search .................................. 395/105, 111, 395/114, 115, 117; 358/403, 468; 328/180

[56] References Cited

U.S. PATENT DOCUMENTS

| | | | |
|---|---|---|---|
| 4,928,252 | 5/1990 | Gabbe et al. ............................ | 395/102 |
| 4,974,035 | 11/1990 | Rabb et al. ............................. | 355/320 |
| 5,133,048 | 7/1992 | Parsons et al. ......................... | 395/111 |
| 5,210,622 | 5/1993 | Kelley et al. ........................... | 358/451 |
| 5,333,246 | 7/1994 | Nagasaka ................................ | 345/433 |
| 5,337,161 | 8/1994 | Hube ....................................... | 358/448 |
| 5,402,527 | 3/1995 | Bigby et al. ............................ | 395/101 |
| 5,435,544 | 7/1995 | Mandel ................................... | 271/298 |
| 5,519,501 | 5/1996 | Hamilton ................................ | 358/296 |
| 5,668,938 | 9/1997 | Tomory ................................... | 395/115 |

*Primary Examiner*—Christopher S. Kelley
*Assistant Examiner*—Sheela Chawan
*Attorney, Agent, or Firm*—Gary B Cohen

[57] ABSTRACT

A printing system in which multiple images are positioned on multiple special electronic pages is provided. The printing system includes an interpreter which reads a stream written in a page description language (PDL). Upon reading a first portion of the PDL stream, a position indicator is established to indicate where a first one of the multiple images is to be positioned on a first one of the multiple special electronic pages. In response to reading a second portion of the PDL stream, the position indicator is used to automatically indicate where a second one of the multiple images is to be positioned on a second one of the multiple special electronic pages.

20 Claims, 5 Drawing Sheets

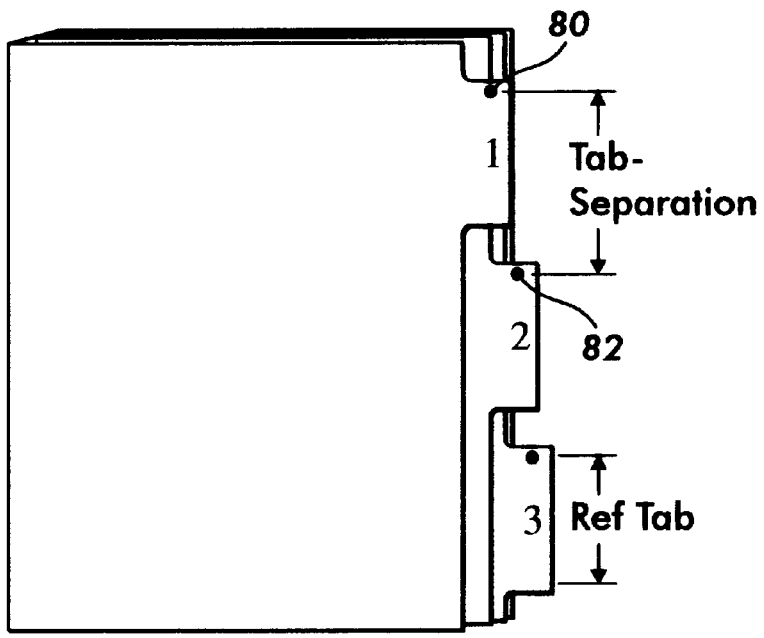
FIG. 6
FIG. 7A
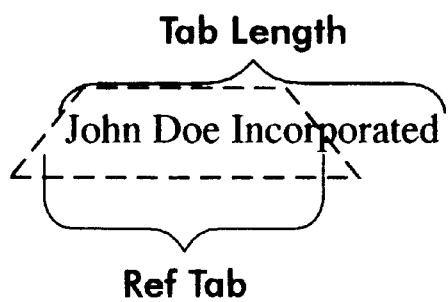
FIG. 7B
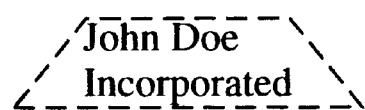

SYSTEM FOR POSITIONING IMAGE INFORMATION ON SPECIAL PRINT MEDIA SHEETS

BACKGROUND

This invention relates generally to a printing system and, more particularly, to a system for automatically positioning a second image on a to second special stock page based, at least in part, on stored information regarding the position of a first image previously positioned on a first special stock page.

Electronic printing systems typically include an input section, sometimes referred to as an input image terminal ("IIT"), a controller, sometimes referred to as an electronic subsystem ("ESS") and an output section or print engine, sometimes referred to as an image output terminal ("IOT"). In one type of electronic printing system, manufactured by Xerox® Corporation, known as the DocuTech® electronic printing system, a job can be inputted to the printing system from, among other sources, a network. An example of a printing system with a network input is found in the following patent:

U.S. Pat. No. 5,170,340

Patentees: Prokop et al.

Issued: Dec. 8, 1992

When a network is used to generate the job, a stream of data, including various job related instructions and image data, expressed in terms of a page description language ("PDL") is captured, decomposed and stored for printing. As is known, a network job can have its origin in a remote client, such as a workstation, or a print server with a storage device. Jobs provided at the IIT may be interpreted or RIPed for either immediate output or storage in mass memory, e.g. in disk.

It has been found that a typical electronic printing system is particularly well suited for use with a network printing arrangement in which a printer or digital copier is interfaced with a client (e.g. workstation) by way of a suitable network connection and print server. The following patents represent examples of servers suitable for use with printing systems:

U.S. Pat. No. 5,113,494

Patentees: Menendez et al.

Issued: May 12, 1992

U.S. Pat. No. 5,179,637

Patentee: Nardozzi

Issued: Jan. 12, 1993

U.S. Pat. No. 5,220,674

Patentees: Morgan et al.

Issued: Jun. 15, 1993

U.S. Pat. No. 5,450,571

Patentees: Rosekrans et al.

Issued: Sep. 12, 1995

U.S. Pat. No. 5,467,434

Patentees: Hower, Jr. et al.

Issued: Nov. 14, 1995

U.S. Pat. No. 5,467,434 discloses an arrangement in which a client programs a job for printing at a remote printer. In practice, the client user is provided with a dialog which facilitates programming of the job. Pursuant to programming the job, the client user may designate that certain special stock such as one or more precut stock sheets with corresponding tab portions (hereinafter referred to as "tabs"), are to be printed with the job. In one example, the client user provides a plurality of images (e.g. a plurality of text portions) for printing on the tabs. As is conventional, a first predesignated image would be printed on a first tab portion, a second predesignated image would be printed on a second tab portion, and so on. Preferably the tab information would be embedded in a data stream written in a suitable PDL, such as Postscript ("Postscript" is a trademark of Adobe Corp.). The following patents relate to the area of printing information on precut tabs:

U.S. Pat. No. 4,974,035

Patentee: Rabb et al.

Issued: Nov. 27, 1990

U.S. Pat. No. 5,133,048

Patentees: Parsons et al.

Issued: Jul. 21, 1992

U.S. Pat. No. 5,210,622

Patentees: Kelley et al.

Issued: May 11, 1993

U.S. Pat. No. 5,337,161

Patentee: Hube

Issued: Aug. 9, 1994

U.S. Pat. No. 5,519,501

Patentee: Hamilton

Issued: May 21, 1996

U.S. Pat. No. 5,133,048 discloses an electronic printing system in which multiple sets of ordered stock, such as sets of tabbed stock, can be printed. In the illustrated embodiment of the '048 Patent, tabs are offset laterally from one another to prevent one tab from obscuring the view of another tab. In a set with multiple precut tabs there are a corresponding number of multiple tab offset positions, the number of multiple tab offset positions being equal to a sequence or modulus number.

When printing tab stock sets of the type disclosed in the '048 Patent it is necessary to indicate the positions at which information is to be printed on tab stock. In one conventional approach, it is understood that a client user designates, at a workstation or personal computer ("PC"), that one or more sets of laterally offset tab stock are desired. Information for corresponding tabs is positioned on suitably sized electronic pages by providing appropriate commands, i.e. by inputting a command set. In turn a print driver (see U.S. Pat. No. 5,615,015 to Krist et al. (Issued: Mar. 25, 1997) for further discussion of print drivers) translates the commands into PDL which includes, among other things, instructions for implementing those operations, e.g. image shifts and/or rotations necessary to print the information at the tab positions designated by the client user. Alternatively, the client user could achieve tab positioning of information by inputting information in one orientation and printing the same in another orientation.

The process of providing positioning information for tabs at the workstation or PC can be tedious when programming a job with a significant amount of tab stock. Moreover, the client user must take care in placing each information item in its correct position so that it is not subsequently printed at a wrong location. It would be desirable to provide a system in which manual placement of information by the client user, with respect to tab stock, is minimized, i.e. a system in which a minimum amount of client user input is required to obtain automatic positioning of all tab information in a resulting output document.

The present invention employs network capability to achieve various advantageous ends. The following discussion is intended to provide a background for any appropriate network implementation required by the disclosed embodiment below:

Examples of some recent patents relating to network environments of plural remote terminal shared users of networked printers include Xerox Corporation U.S. Pat. Nos. 5,243,518, 5,226,112, 5,170,340 and 5,287,194. Some patents on this subject by others include U.S. Pat. Nos. 5,113,355, 5,113,494 (originally filed Feb. 27, 1987), U.S. Pat. Nos. 5,181,162, 5,220,674, 5,247,670; 4,953,080 and 4,821,107. Further, by way of background, some of the following Xerox Corporation U.S. patents also include examples of networked systems with printers: U.S. Pat. Nos. 5,153,577; 5,113,517; 5,072,412; 5,065,347; 5,008,853; 4,947,345; 4,939, 507; 4,937,036; 4,920,481; 4,914,586; 4,899,136; 4,453,128; 4,063,220; 4,099,024; 3,958,088; 3,920,895; and 3,597,071. Also noted are IBM Corp. U.S. Pat. Nos. 4,651,278 and 4,623,244, and Canon U.S. Pat. No. 4,760,458 and Jap. Pub. No. 59-63872 published Nov. 4, 1984. Some of these various above patents also disclose multi-functional or integral machines [digital scanner/facsimile/printer/copiers] and their controls.

Some other network system related publications include "Xerox Office Systems Technology" "Xerox 8000 Series Products: Workstations, Services, Ethernet, and Software Development" ©1982, 1984 by Xerox Corporation, OSD-R8203A, Ed. T. Linden and E. Harslem, with a "Table of Contents" citing its numerous prior publications sources, and an Abstract noting the April 1981 announcement of "the 8110 Star Informations System, A New Personal Computer."; "Xerox System Integration Standard Printing Protocol XSIS 118404", April 1984; "Xerox Integrated Production Publishers Solutions:" Booklet No. "610P50807" "11/85"; "Printing Protocol-Xerox System Integration Standard" ©1990 by Xerox Corporation, XNSS 119005 May 1990; "Xerox Network Systems Architecture", "General Information Manual", XNSG 068504 April 1985, with an extensive annotated bibliography, ©1985 by Xerox Corporation; "Interpress: The Source Book", Simon & Schuster, Inc., New York, N.Y., 1988, by Harrington, S. J. and Buckley, R. R.; Adobe Systems Incorporated "PostScript® Language Reference Manual", Addison-Wesley Co., 1990; "Mastering Novell® Netware®", 1990, SYBEX, Inc., Alameda, Calif., by Cheryl E. Currid and Craig A. Gillett; "Palladium Print System" ©MIT 1984, et sec; "Athena85" "Computing in Higher Education: The Athena Experience", E. Balkovich, et al, Communications of the ACM, 28(11) pp. 1214–1224, November, 1985; and "Apollo87" "The Network Computing Architecture and System: An Environment for Developing Distributed Applications", T. H. Dineen, et al, Usenix Conference Proceedings, June 1987.

Noted regarding commercial network systems with printers and software therefor is the 1992 Xerox® Corporation "Network Publisher" version of the 1990 "DocuTech®" publishing system, including the "Network Server" to customer's Novell® 3.11 networks, supporting various different network protocols and "Ethernet"; and the Interpress Electronic Printing Standard, Version 3.0, Xerox System Integration Standard XNSS 048601 (January 1986). Also, the much earlier Xerox® Corporation "9700 Electronic printing System"; the "VP Local Laser Printing" software application package, which, together with the Xerox® "4045" or other Laser Copier/Printer, the "6085" "Professional Computer System" using Xerox Corporation "ViewPoint" or "GlobalView®" software and a "local printer [print service] Option" kit, comprises the "Documenter" system. The even earlier Xerox® Corporation "8000" "Xerox Network Services Product Descriptions" further describe other earlier Xerox® Corporation electronic document printing systems. Eastman Kodak "LionHeart®" systems, first announced Sep. 13, 1990, are also noted.

Current popular commercial published "systems software" including LAN workstation connections includes Novell® DOS 7.0, "Windows®" NT 3.1, and IBM OS/2 Version 2.1.

Disclosures of all of the patents cited and/or discussed in the Background above are incorporated herein by reference.

SUMMARY OF THE INVENTION

In accordance with one aspect of the present invention there is provided a system for a printing system where an electronic document including a set of electronic pages is produced on the basis of a data stream written in a page description language (PDL). The set of electronic pages, which is usable to produce a set of prints, includes at least a first electronic page and a second electronic page as well as a subset of multiple special electronic pages. The datastream includes a set of information identifiers respectively corresponding with the multiple special electronic pages and the system, which causes multiple images to be positioned on the multiple special electronic pages, respectively, comprises: a) an interpreter for receiving the data stream, and (i) reading a first portion of the data stream to detect a first one of the information identifiers in the set of information identifiers and (ii) reading a second portion of the datastream, with the PDL interpreter, to detect a second one of the information identifiers in the set of information identifiers; b) a variable position indicating subsystem communicating with said interpreter, said variable position indicating subsystem, in response to said detecting of the first one of the information identifiers in the set of information identifiers, establishing a first position indicator relative to the subset of multiple special electronic pages, the first position indicator indicating a first position at which a first one of the multiple images is to be positioned on a first one of the multiple special electronic pages; c) an information positioning subsystem communicating with said variable position indicating subsystem, said information positioning subsystem, in response to said detecting of the second one of the information identifiers in the set of information identifiers, using the first position indicator to automatically establish a second position indicator relative to the subset of multiple special electronic pages, the second position indicator indicating a second position at which a second one of the multiple images is to be positioned on a second one of the multiple special electronic pages.

BRIEF DESCRIPTION OF THE DRAWINGS

FIG. 6 is a schematic, elevational view of a set of precut tab stock in which tab portions thereof are laterally offset relative to one another;

FIG. 7A is a schematic, elevational view of a tab portion of tab media sheet in which the length of a text portion is shown as exceeding an amount of space allocated for the image; and FIG. 7B is a schematic, elevational view of a tab portion in which the text portion is shown as being "wrapped" so as to fit on the tab portion.

DESCRIPTION OF THE INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
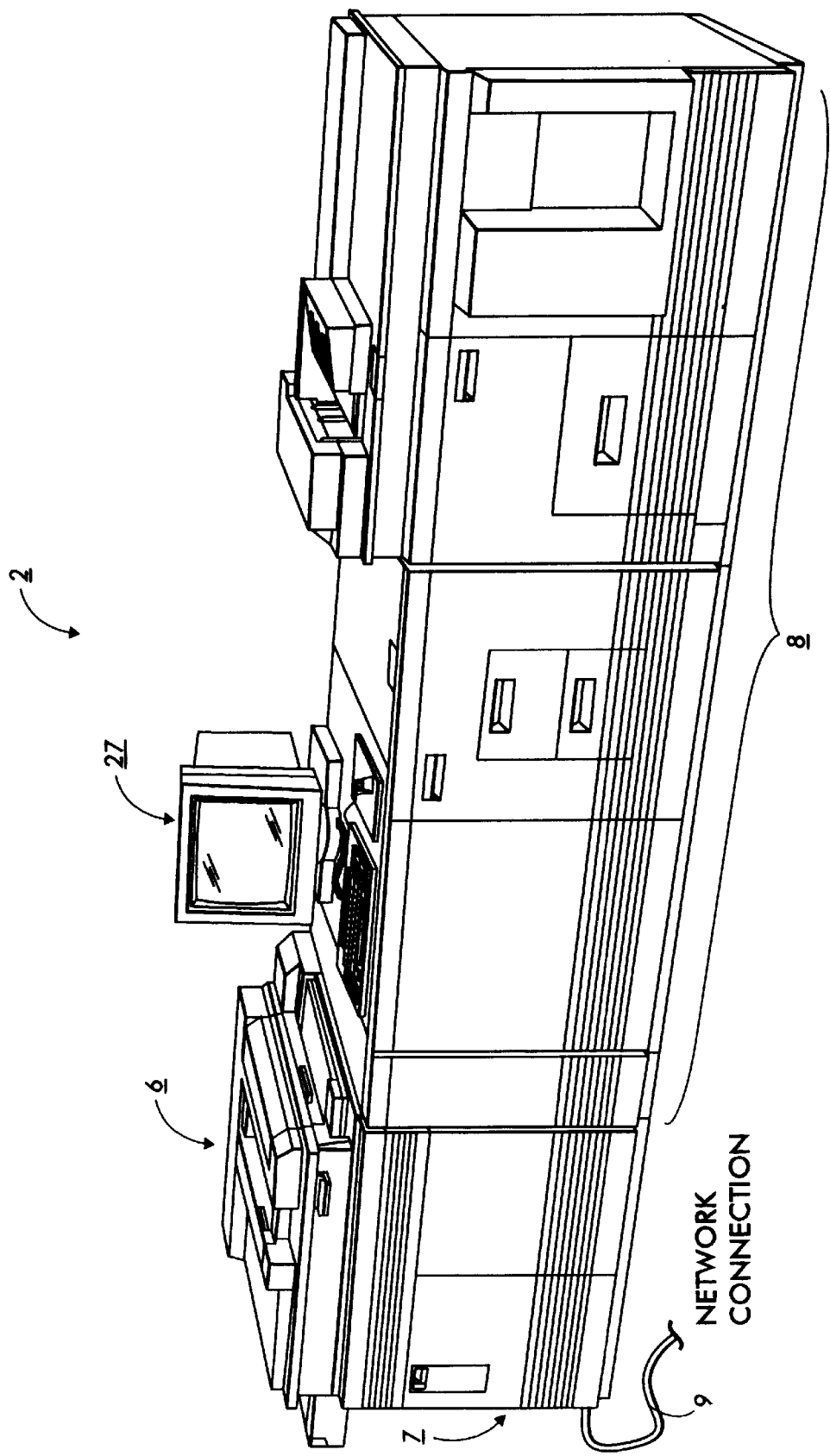
FIG. 1 is a perspective view of a network capable electronic printing system in which an image positioning system, embodying the present invention, can be employed.

Referring to FIG. 1, there is shown an exemplary laser-based, printing system 2 for processing printing and finishing jobs in accordance with the teachings of the present invention. Printing system 2 for purposes of explanation is divided into a scanner section 6, controller section 7, and printer section 8. While the structure and operation of the printing system 2 is believed to be conventional, a comprehensive understanding of the printing system 2 can be obtained by reference to U.S. Pat. No. 5,170,340, the first patent mentioned in the Background above. As with the '340 Patent, the printing system 2 is network capable and is connected to a network by way of line 9.

Figure 2:
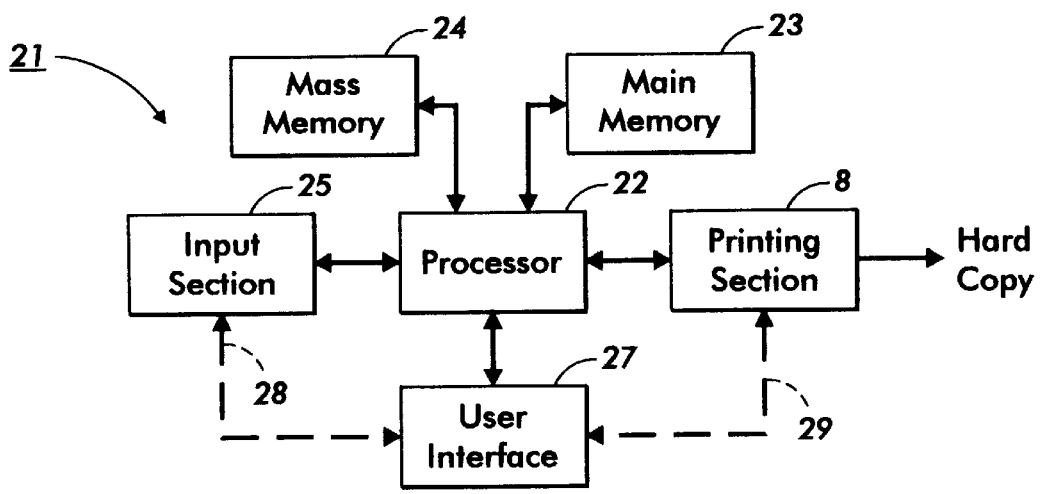
FIG. 2 is a block diagram illustrating a printing subsystem used with the electronic printing system of FIG. 2.

Turning now to FIG. 2, a document processing system 21, including some of the primary subsystems of printing system 2, is shown. In keeping with standard practices, the document processing system 21 comprises a digital processor 22 communicating with a main memory 23 and a mass memory 24, an input section 25 (including the scanner 6) for providing a job written in a printer page description language (PDL), and the printing section 8 for printing hardcopy renderings of selected image components obtained from the PDL. Furthermore, there is a user interface 27 (also see FIG. 1) for enabling a user to interact with the processor 22, the input section 25, and the printing section 8.

As will be understood, the user interface 27 collectively represents the input devices through which the user enters image editing and manipulation instructions for the processor 22. Additionally, the interface 27 represents the output devices through which the user receives feedback with respect to the actions that are taken in response to the instructions that are entered by the user or otherwise, such as under program control. For example, the user interface 27 generally includes a keyboard or the like for entering use instructions, a monitor for giving the user a view of the process that is being performed by the processor 22, and a cursor controller for enabling the user to move a cursor for making selections from and/or for entering data into a process that is being displayed by the monitor (some of these conventional components are shown in FIG. 1).

The illustrated document processing system 21 is centralized, so it has been simplified by assuming that all control instructions and all image editing and manipulation instructions are executed by the processor 22 under program control. In practice, however, the execution of these instructions may be handled by several different processors, some or all of which may have their own main memory and even their own mass memory. Likewise, either or both of the input section 25 and the printing section 8 may have its own user interface, as indicated by the dashed lines 28 and 29, respectively. Indeed, it will be evident that the document processing system 21 could be reconfigured to have a distributed architecture to operate with a remote input section and/or a remote printer (not shown). Data could be transferred from and to such remote input section and printer terminals via dedicated communication links or switched communication networks (also not shown).

Figure 3:
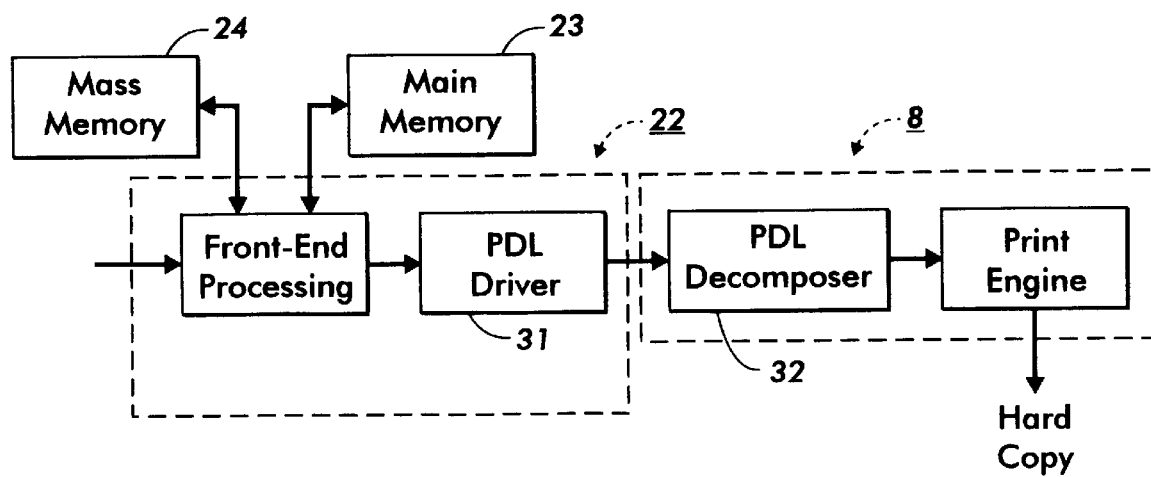
FIG. 3 is a schematic, block diagrammatic view of a processor/printer interface for employment in the printing subsystem of FIG. 2.

As shown in FIG. 3, the processor 22 preferably includes a PDL driver 31 for transferring to the printing section 8 PDL descriptions of the electronic document files that are selected for printing. Thus, the printing section 8 is illustrated as having a PDL decomposer 32 for decomposing such PDL descriptions to produce corresponding bitmapped image file. It will be appreciated, particularly in view of the discussion below, that the decomposer or interpreter 32 is capable of receiving PDL files from mass memory, such as disk, or from off the network "on the fly."

Figure 4:
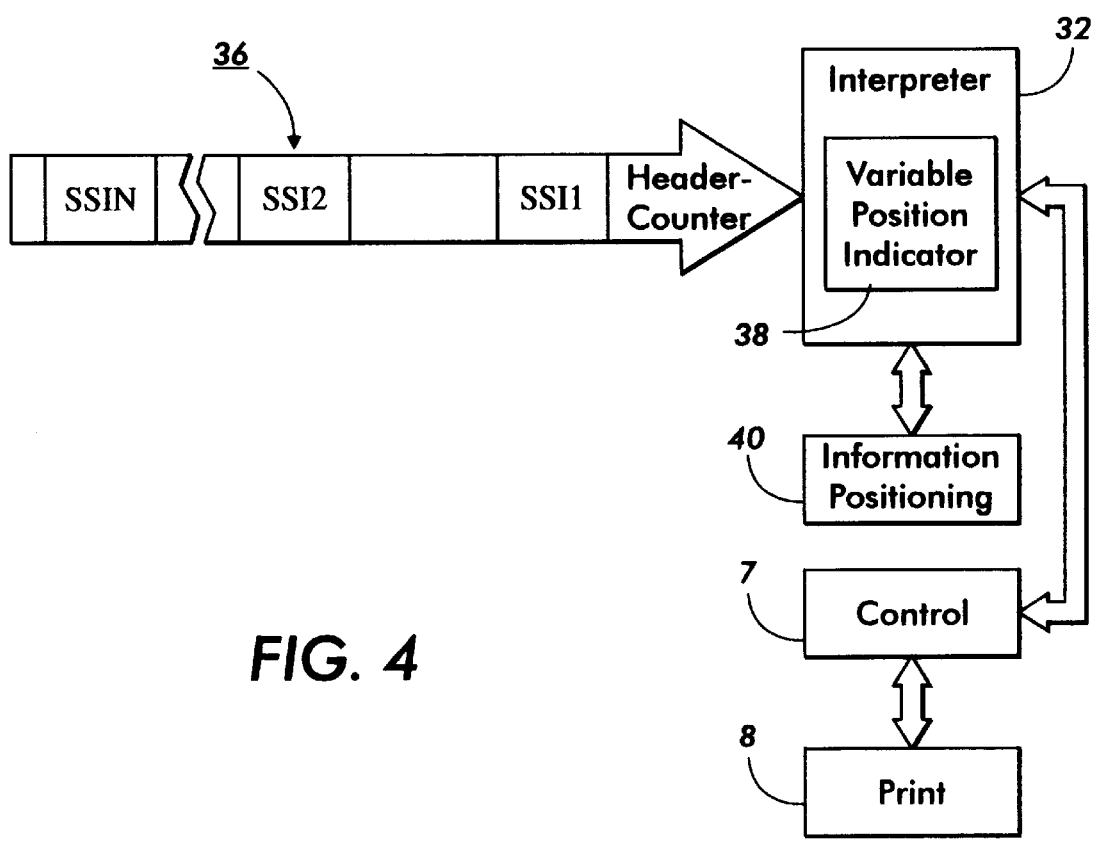
FIG. 4 is a schematic, block diagrammatic view of a system suitable for implementing a technique for automatically positioning an image at a selected location on a print media sheet.

Referring now to FIG. 4, an overview of an information positioning technique of the preferred embodiment is provided. In the illustrated embodiment of FIG. 4, a data stream 36 is received at the interpreter 32 for RIPing thereof. As shown, the data or PDL stream includes information about special stock printing (e.g. information which permits the printing of images on tab stock), the pages for the special stock information being designated as "SSI1", SSI2", and so on. The significance of the special stock information to the present information positioning technique will appear from the description of FIG. 5 below.

It will be appreciated that the interpreter of FIG. 4 is shown in schematic form without its various subsystems. A more detailed description of an interpreter can be found in U.S. Pat. No. 5,493,634 to Bonk et al. (Issued: Feb. 20, 1996), the disclosure of which is incorporated herein by reference. The interpreter 32, in one embodiment includes a variable position indicating subsystem 38 which, as described in further detail below, permits the printing system 2 to maintain a record of how many times a set of special stock information is encountered. The indicating subsystem 38, which in one example includes a counter (or any other suitable adding or subtracting subsystem), communicates with an information positioning subsystem 40. Additionally, the counter may embedded in a "dictionary" of the interpreter. The subsystem 40, as will appear below, serves to determine where the information of the special stock information sets should be positioned on corresponding special stock and to insure that such information is actually positioned on the corresponding special stock in a suitable manner. It should be appreciated that while the indicating subsystem 38 is shown as being separated from the subsystem 40, the indicating subsystem 38 and subsystem 40 could be implemented in the same memory area.

Figure 5:
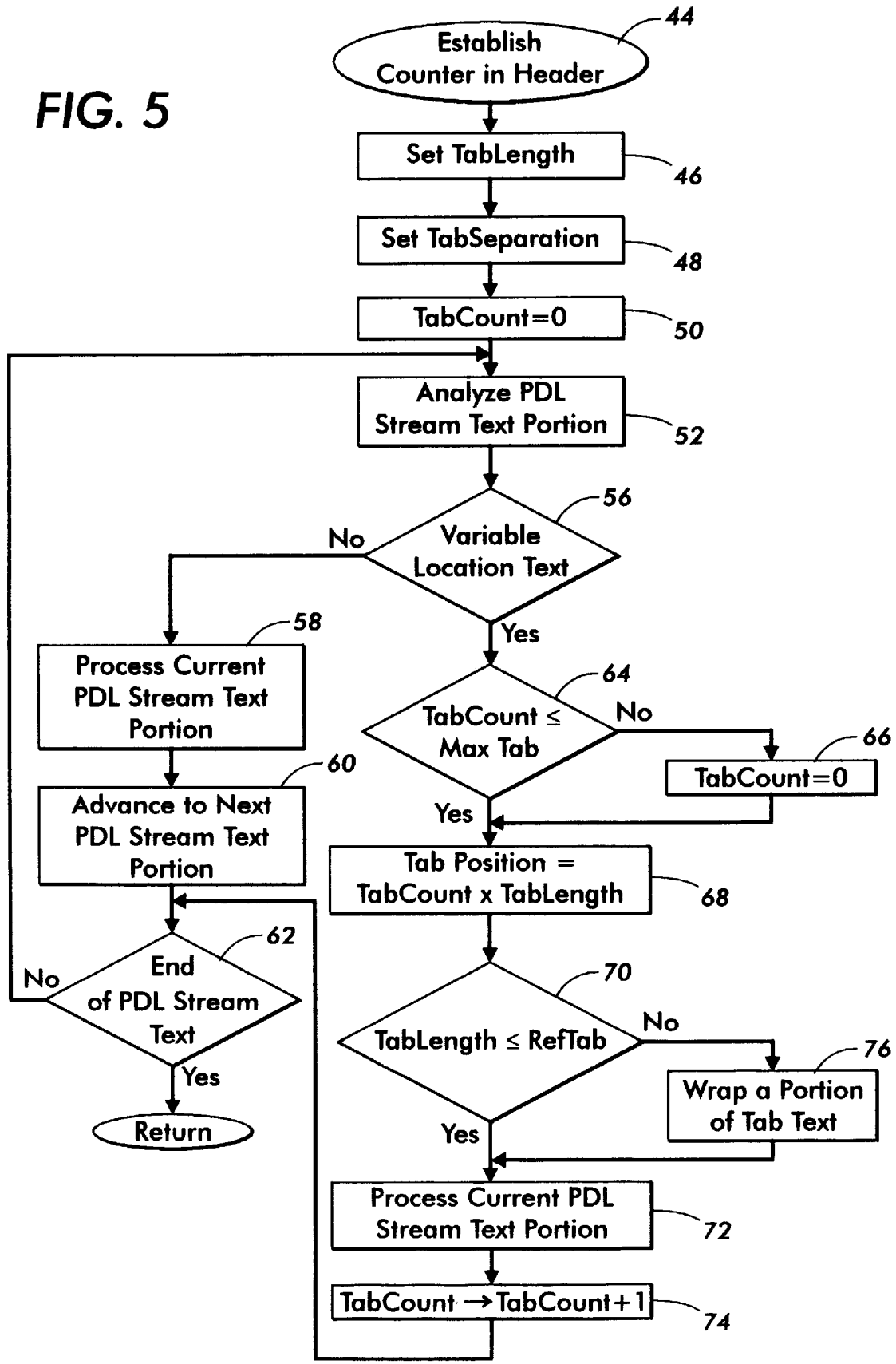
FIG. 5 is a flow diagram illustrating a preferred mode of operation suitable for use with the system of FIG. 4.

Referring now to FIGS. 4 and 5, operation of the present information positioning technique will be discussed in detail. Initially, at step 44, a counter (comprising a plurality of bits) is read by the interpreter 32. In turn, the counter is established in a suitable location, such as a global dictionary associated with the interpreter. As contemplated by the illustrated embodiment of FIG. 4, the counter is the main component of the variable position indicating subsystem 38. It will be appreciated that section 38 is provided with a generic label because a count can be maintained with a variety of devices ("soft" or otherwise) or programs other than a counter. Moreover, the subsystem of section 38 can provide incrementing or decrementing functionality, depending on whether the system design is intended for "up-counting" or "down-counting".

In conjunction with establishing the counter, certain variables, such as "TabSeparation" and "RefTab" are set, via steps 46 and 48, with the subsystems 38,40. In the described embodiment, RefTab refers to the actual length taken up by an image (e.g. text) on a tab or other special stock portion, while TabSeparation refers to the distance from the top of one tab to the top of another adjacent, offset tab. Referring to FIG. 6 (in which a set of three tab media sheets (sequence number=3) is shown), the concept underlying TabSeparation and RefTab is represented visually. It should be appreciated that not all tab stock sets are ordered uniformly as shown in FIG. 6 or that one set of default values for {RefTab, TabSeparation} are optimum for all jobs. In one contemplated embodiment, values for customized sets would be stored in memory via a look-up table. This would accommodate for the handling of irregular sets in which the value of either TabSeparation or RefTab may be nonuniform and thus unpredictable. Moreover, it may be appropriate to reset the values of TabSeparation and TabLength according to the primary stock called for by a given job. For instance, in Europe, the size of tab stock may be different than in the United States. An embodiment which accommodates for resetting of {RefTab, TabSeparation}, in view of a variation in the primary stock size of a job, is discussed in further detail below.

Referring now to step 50, the count of the counter, namely "TabCount" is initialized at zero. The illustrated step 50 assumes that the count goes up instead of down. In an alternative embodiment it may be preferable to set the counter at a value corresponding with the number of tabs in a job and count "backwards" or down. Upon initialing the counter and setting up the interpreter for RIPing, analysis of the incoming PDL stream 36 (FIG. 4) begins at step 52. Analysis of the PDL stream is performed in accordance with any conventional analytical routine, such as the routine described in U.S. Pat. No. 5,504,843 to Catapano (Issued: Apr. 2, 1996), the disclosure of which is incorporated herein by reference.

At step 56, the type of image represented by a portion or string of the PDL stream, i.e. the type of image described by the "text" of the PDL stream, is considered by the interpreter 32 (FIG. 4). For each string found to be associated with an image disposed "normally" on stock (e.g. a bitmap disposed on 8.5×11 standard white stock), one or more suitable processing steps are performed at step 58 (e.g. an image component and/or an instruction associated with marking the image component are stored in memory). It will be appreciated that an image, for purposes of the preferred embodiment is considered to be normally disposed on stock when its offset position, relative to another image, need not be calculated.

While it will be recognized that this sort of definition tends to apply to images positioned on laterally offset tab stock, it could apply to any situation where image data position is calculated, from a PDL stream, as a function of previously considered PDL information. For example, an image (e.g. text and/or logo) could be offset across a set of cover stock or job separators. In response to performing step 58, analysis of the PDL stream advances to the next string (step 60). If the next string is determined to be the last string for the job (see step 62), then the process executes a return; otherwise, the process loops back to step 52 where another string is analyzed.

Upon encountering a portion or string indicating that a piece of information may have a variable location, relative to a previously considered image, a check is performed at step 64 to determine if TabCount must be reset to accommodate for a repetition within the ordered stock. For example, for ordered stock (e.g. tab stock) with a repeating pattern, there may be multiple sets of M sheets (where, in one example, the value of M is equal to a sequence or modulus number). As will appear, the value of "MaxTab" for a typical set of tab stock will equal M−1. When it is determined that the value of TabCount exceeds the value of MaxTab, then the value of TabCount is reset, via step 66, to a value of zero. In any event, the position at which the current image in the PDL stream should be set is calculated at step 68 with the formula:

$$TabPosition = TabCount \times TabSeparation$$

Pursuant to positioning an image associated with the variable location text on an electronic page, a determination as to the length of the image (step 70) is made. In the example of step 70, "TabLength" corresponds with the length of a tab; however, in other contemplated embodiments, the image length being considered may not correspond with a tab image, but rather with the length of an image positioned on other types of ordered stock. If the value of TabLength is less than or equal to a preset reference value, namely RefTab (FIG. 6) then the current PDL portion (referred to FIG. 6 as "SSI__") is processed in a suitable manner (see discussion of step 58 above), via step 72, and the value of TabCount is incremented at step 74.

If the value of TabLength is greater than the value of RefTab (see FIG. 7A), then an appropriate sizing operation is performed by way of step 76. In the illustrated embodiment of FIG. 5, the sizing operation relates to a wrapping operation in which text has been split and realigned (shifted) within a tab portion. This sort of wrapping operation could be implemented with a reduction/enlargement application, of the type disclosed in U.S. Pat. No. 5,319,470 to Shukunami (Issued: Jun. 7, 1994) (the disclosure of which is incorporated herein by reference) in which printing area width is compared to page width for the sake of splitting one line of text into two lines of text when necessary. It will be appreciated by those skilled in the art that other conventional image processing packages which permit the splitting of one line of text into two lines of text for the sake of fitting an image into an area of fixed length exist.

Referring to FIGS. 4–6, a working example of how the information positioning technique of the preferred embodiment operates will be provided. Assume for purpose of the example that instructions for processing at least two subsets of tab stock are embedded in the job and each subset has a modulus number (M) of three. In the working example the substance of the first subset of tab stock is based on PDL information provided via SSI1–SSI3 (SSI3 not shown) and the substance of the second subset of tab stock is based on PDL information provided via SSI4–SSI6 (not shown). Additionally, as mentioned above, if the subsets were irregular, then information regarding the composition of each subset could be stored in, for example, a look-up table. Initially a counter is established in the variable position indicating subsystem 38 and set to zero at step 50. When SSI1 (FIG. 4) is encountered by the interpreter 32, the value of TabCount is set at zero, so the process proceeds to step 68 where a value for TabSeparation is obtained from a suitable memory location and multiplied by the current value of TabCount.

In one embodiment, TabSeparation is a preset value obtained from a suitable memory location. In an alternative embodiment, however, the value of TabSeparation would be set dynamically to accommodate for the primary stock size used in printing the job with which the special stock (SSI__) is associated and/or the sequence number of the tab stock set. Accordingly if a job were to be printed primarily on A4 stock rather than 8.5×11 stock, then TabSeparation would be set to accommodate for a tab stock with a size other than 9×11. In one contemplated example, the look-up table corresponding primary stock size with TabSeparation would be provided. In one example the look-up table would be associated with the information positioning subsystem 40 (FIG. 6), and the interpreter would read primary job stock size from a PDL stream header. In turn, the interpreter would communicate with the information positioning subsystem 40 in such a manner that the subsystem 40 could use the look-up table to obtain an optimum value for TabSeparation. Additionally, the look-up table could be provided with a mapping of sequence numbers to corresponding TabSeparation values.

Referring again to the working example, in view of the current count of the counter, the value of TabPosition is zero and the image associated with SSI1 is written at an initial location. When tab stock with laterally offset tabs is being employed, the initial position corresponds with a left top point designated, in FIG. 6, by the numeral 80. Upon setting up a tab media sheet for the first tab and positioning associated image information therewith, the value of Tab-Count is incremented and the process loops back to step 52—no further tab media sheet setup is performed until SSI2 is encountered. When performing the process with TabCount=1, the value of TabSeparation is equal to the currently stored value of TabSeparation so that the image information associated with the second tab starts at point 82. When the third tab media sheet is set up for SSI3 (not shown), the value of TabSeparation is at 2×TabSeparation and tab information is positioned relative to point 84. Subsequent to the processing of the third tab media sheet, the value of TabCount moves up to a magnitude of four. Accordingly, when the process for handling SSI4 encounters step 64, TabCount is reset at a value of zero, and the setup of the tab media sheets for the second tab stock subset follows a pattern similar to the setup of the first tab stock subset.

Numerous features of the above-described preferred embodiment will be appreciated by those skilled in the art:

First, the technique permits the automatic positioning of a second image on a second special stock sheet based on previously provided information regarding the positioning of a first image on a first special stock sheet. In one contemplated approach, the automatic positioning is achieved with the product of a count and a selected tab separation value. As disclosed, the count may be conveniently initialized through a cooperative relationship between an interpreter with a dictionary and an incoming PDL stream with a set of count bits. This contemplated approach is particularly advantageous when used with tab stock since the amount of tab position information required to be input is minimized.

Second, the tab separation value can be selected with a high degree of system intelligence. For instance, the tab separation value can be selected to correspond with the primary stock size of a job with which the tab separation value is associated and/or the sequence or modulus number of a tab stock subset in the job. This is particularly advantageous in an international context since not all users around the world develop their jobs on stock of the same size. In one example of the preferred embodiment, one tab separation value would be set for a job printed predominantly on 8.5×11 stock while another tab separation value would be set for a job printed predominantly on A4 stock. Additionally, a stock size/tab separation value mapping and/or modulus number/tab separation value mapping may be advantageously organized in a look-up table.

Third, the technique automatically accommodates for repeating patterns present in ordered stock. More particularly, once a sequence number is provided for a job, the count will be automatically reset for each subset in a set of ordered stock. Hence in setting up information regarding a set of ordered stock, a user need not specifically program the system to accommodate for multiple resets in the count.

Finally, the technique permits the fitting of "oversized" text on tab portions. For those situations in which a phrase in too long for a given tab portion, the system conveniently breaks up the phrase and permits a portion is thereof to be printed on a second line of the tab portion. This prevents loss of information due to tab information "running off" the tab portion.

What is claimed is:

1. In a printing system where an electronic document including a set of electronic pages corresponding respectively with a set of distinct print media sheets is produced on the basis of a data stream written in a page description language (PDL), the set of electronic pages including at least a first electronic page and a second electronic page, the set of electronic pages also including a subset of multiple special electronic pages corresponding respectively with selected ones of the set of distinct print media sheets and being used to produce a set of prints, the datastream including a set of information identifiers respectively corresponding with the multiple special electronic pages and thus the selected ones of the set of distinct print media sheets, a system for causing multiple images to be positioned on the multiple special electronic pages, respectively, comprising:

a) an interpreter for receiving the data stream, and (i) reading a first portion of the data stream to detect a first one of the information identifiers in the set of information identifiers and (ii) reading a second portion of the datastream, with the PDL interpreter, to detect a second one of the information identifiers in the set of information identifiers;

b) a variable position indicating subsystem communicating with said interpreter, said variable position indicating subsystem, in response to said detecting of the first one of the information identifiers in the set of information identifiers, establishing a first position indicator relative to the subset of multiple special electronic pages, the first position indicator indicating a first position at which a first one of the multiple images is to be positioned on a first one of the multiple special electronic pages so that the first one of the multiple special electronic paces is printed on a first one of the selected ones of the set of distinct print media sheets; and c) an information positioning subsystem communicating with said variable position indicating subsystem, said information positioning subsystem, in response to said detecting of the second one of the information identifiers in the set of information identifiers, using the first position indicator to automatically establish a second position indicator relative to the subset of multiple special electronic pages, the second position indicator indicating a second position at which a second one of the multiple images is to be positioned on a second one of the multiple special electronic pages so that the second one of the multiple special electronic paces is printed on a second one of the selected ones of the set of distinct print media sheets.

2. The system of claim 1, wherein:

a distance related value is provided; and the second position at which the second one of the multiple images is to be positioned is indicated with both the first position indicator and the distance related value.

3. The system of claim 2, in which each electronic page in a subset of the set of electronic pages is characterized by a set of dimensions, wherein the distance related value is set as a function of the set of dimensions.

4. The system of claim 2, in which the multiple special electronic pages include a number of multiple tab portions, respectively, wherein the distance related value is set as a function of the number of the multiple tab portions.

5. The system of claim 1, wherein said variable position indicating subsystem includes an incrementing or decrementing subsystem, and the first position indicator comprises an incrementable position indicating value settable in said incrementing or decrementing subsystem.

6. The system of claim 1, in which the first and second ones of the multiple special electronic pages include a first tab portion and a second tab portion, respectively, wherein the first and second ones of the multiple images are positioned respectively on the first and second tab portions.

7. A method for a printing system in which a data stream, written in a page description language (PDL), is processed with a PDL interpreter to produce an electronic document including a set of electronic pages, the set of electronic pages including at least a first electronic page and a second electronic page, the set of electronic pages also including a subset of multiple special electronic pages corresponding respectively with selected ones of the set of distinct print media sheets and being used to produce a set of prints, the datastream including a set of information identifiers respectively corresponding with the multiple special electronic pages and thus the selected ones of the set of distinct print media sheets, said method causing multiple images to be positioned on the multiple special electronic pages, respectively, comprising:

a) reading a first portion of the data stream, with the PDL interpreter, to detect a first one of the information identifiers in the set of information identifiers;

b) in response to said (a), establishing a first position indicator, relative to the subset of multiple special electronic pages, for indicating a first position at which a first one of the multiple images is to be positioned on a first one of the multiple special electronic pages so that the first one of the multiple special electronic pages is printed on a first one of the selected ones of the set of distinct print media sheets;

c) reading a second portion of the datastream, with the PDL interpreter, to detect a second one of the information identifiers in the set of information identifiers; and d) in response to said (c), using the first position indicator to automatically establish a second position indicator relative to the subset of multiple special electronic pages, the second position indicator indicating a second position at which a second one of the multiple images is to be positioned on a second one of the multiple special electronic pages so that the second one of the multiple special electronic pages is printed on a second one of the selected ones of the set of distinct print media sheets.

8. The method of claim 7, further comprising:

e) providing a distance related value; and f) indicating the second position at which the second one of the multiple images is to be positioned with both the first position indicator and the distance related value.

9. The method of claim 8, in which each electronic page in a subset of the set of electronic pages is characterized by a set of dimensions, wherein said (e) includes setting the distance related value as a function of the set of dimensions.

10. The method of claim 8, in which the multiple special electronic pages include a number of multiple tab portions, respectively, wherein said (e) includes setting the distance related value as a function of the number of multiple tab portions.

11. The method of claim 8, wherein said (e) includes obtaining the distance related value from a look-up table in which a plurality of stock types or sequence numbers are mapped against a plurality of distance related values.

12. The method of claim 7 wherein said (b) includes establishing the first position indicator with an incrementing or decrementing subsystem wherein the first position indicator comprises an incrementable position indicating value settable in the incrementing or decrementing subsystem.

13. The method of claim 12, further comprising configuring the incrementing or decrementing subsystem as a counter.

14. The method of claim 12, further comprising disposing the incrementing or decrementing subsystem in the PDL interpreter.

15. The method of claim 12, in which the second position indicator comprises a second position indicator value, wherein said (d) includes automatically establishing the second position indicator value by incrementing or decrementing the first position indicator value with the incrementing or decrementing subsystem when a preselected condition is met.

16. The method of claim 15, further comprising determining whether the preselected condition has been met by comparing the second position indicator value with a reference value.

17. The method of claim 16, further comprising setting the second position indicator value to a base value when it is determined, by way of said determining, that the second position indicator value would exceed the reference value.

18. The method of claim 7, in which the first and second ones of the multiple special electronic pages include a first tab portion and a second tab portion, respectively, further comprising positioning the first and second ones of the multiple images on the first and second tab portions, respectively.

19. The method of claim 18, in which, the first one of the multiple images and the second one of the multiple images are characterized respectively by a first text portion and a second text portion, the first one of the multiple images and the second one of the multiple image are characterized respectively by a first image length and a second image length, and the first tab and the second tab are characterized respectively by a first tab length and a second tab length, further comprising:
splitting up the first text portion for printing on multiple lines when the first image length exceeds the first tab length; and
splitting up the second text portion for printing on multiple lines when the second image length exceeds the second tab length.

20. A system for causing multiple images to be positioned on multiple special electronic pages, respectively, comprising:
a) a decomposer subsystem for receiving a data stream written in a page description language (PDL) and representative of a set of electronic pages including at least a first electronic page and a second electronic page, the set of electronic pages also including a subset of multiple special electronic pages and being used to produce a set of prints, the datastream including a set of information identifiers respectively corresponding with the subset of multiple special electronic pages corresponding respectively with selected ones of the set of distinct print media sheets;
b) said decomposer subsystem being used to read (i) a first portion of the data stream for detecting a first one of the information identifiers in the set of information identifiers and (ii) a second portion of the datastream for detecting a second one of the information identifiers in the set of information identifiers;
c) a variable position indicating subsystem communicating with said decomposer subsystem, said variable position indicating subsystem, in response to said detecting of the first one of the information identifiers in the set of information identifiers, establishing a first position indicator relative to the subset of multiple special electronic pages, the first position indicator indicating a first position at which a first one of the multiple images is to be positioned on a first one of the multiple special electronic pages so that the first one of the multiple special electronic pages is printed on a first one of the selected ones of the set of distinct print media sheets; and
d) an information positioning subsystem communicating with said variable position indicating subsystem, said information positioning subsystem, in response to said detecting of the second one of the information identifiers in the set of information identifiers, using the first position indicator to automatically establish a second position indicator relative to the subset of multiple special electronic pages, the second position indicator indicating a second position at which a second one of the multiple images is to be positioned on a second one of the multiple special electronic pages so that the second one of the multiple special electronic sages is printed on a second one of the selected ones of the distinct print media sheets.

* * * * *